United States Patent [19]

Dillman

[11] Patent Number: 4,700,917
[45] Date of Patent: Oct. 20, 1987

[54] ADJUSTABLE LOAD BINDING HOOK

[76] Inventor: John S. Dillman, 220 Athol Ave., Apt. 205, Oakland, Calif. 94606

[21] Appl. No.: 907,399

[22] Filed: Sep. 15, 1986

[51] Int. Cl.⁴ .............................................. E04G 3/00
[52] U.S. Cl. ................................ 248/228; 248/231.7; 248/304
[58] Field of Search ............... 248/228, 227, 304, 322, 248/343, 297.2, 307, 231.7

[56] References Cited

U.S. PATENT DOCUMENTS

| | | | |
|---|---|---|---|
| 960,326 | 6/1910 | Horn et al. | 248/227 |
| 2,422,865 | 6/1947 | Tucker | 248/228 |
| 2,675,201 | 4/1954 | Friel | 248/228 |
| 2,719,691 | 10/1955 | Vance | 248/208 |
| 2,954,200 | 9/1960 | Gannon et al. | 248/228 |
| 3,178,032 | 4/1965 | Patrick et al. | 248/227 X |
| 3,232,393 | 2/1966 | Attwood | 248/228 X |
| 3,301,513 | 1/1967 | Sugaya | 248/228 X |
| 3,333,799 | 8/1967 | Peterson | 248/14 |
| 3,936,023 | 2/1976 | Clifton | 248/228 |
| 4,065,090 | 12/1977 | Mauney | 248/318 |
| 4,112,550 | 9/1978 | De Witt et al. | 248/227 |

FOREIGN PATENT DOCUMENTS 2367216 5/1978 France .................................. 248/228
806022 12/1958 United Kingdom ................ 248/228

Primary Examiner—Ramon S. Britts
Assistant Examiner—David M. Purol
Attorney, Agent, or Firm—Robert R. Tipton

[57] ABSTRACT

An adjustable load binding hook for use on truck beds and trailers utilizes a generally rectangular base support having first and second base support flanges along opposite sides of the base support member. The first and second base support flanges are angled inwardly toward each other to partially wrap around and engage the flange of an I-beam under the bed of a truck or trailer. One or more hooks are attached to the base support member which are adapted to received ropes chains or the like for binding a load to the bed of the truck or trailer. A threaded hole or the like in one of the base support flanges is adapted to receive a bolt or the leg portion of a hook. The end of the bolt or hook is adapted to frictionally engage and bar against the web of the I-beam to fasten the device rigidly to the I-beam.

3 Claims, 10 Drawing Figures

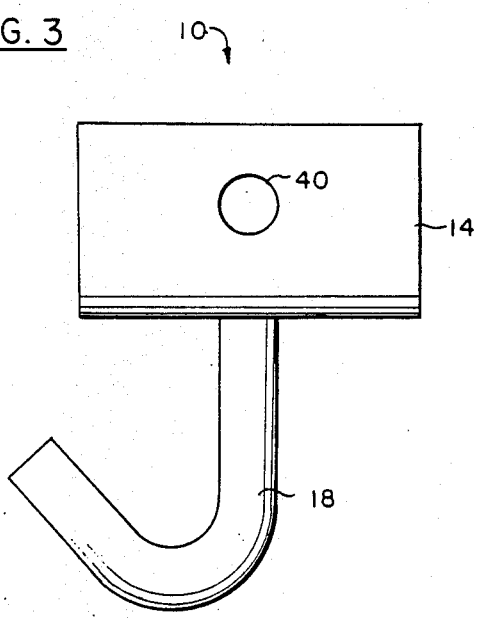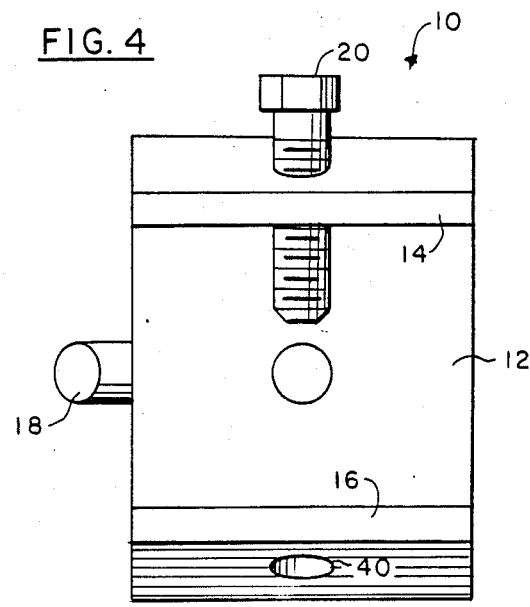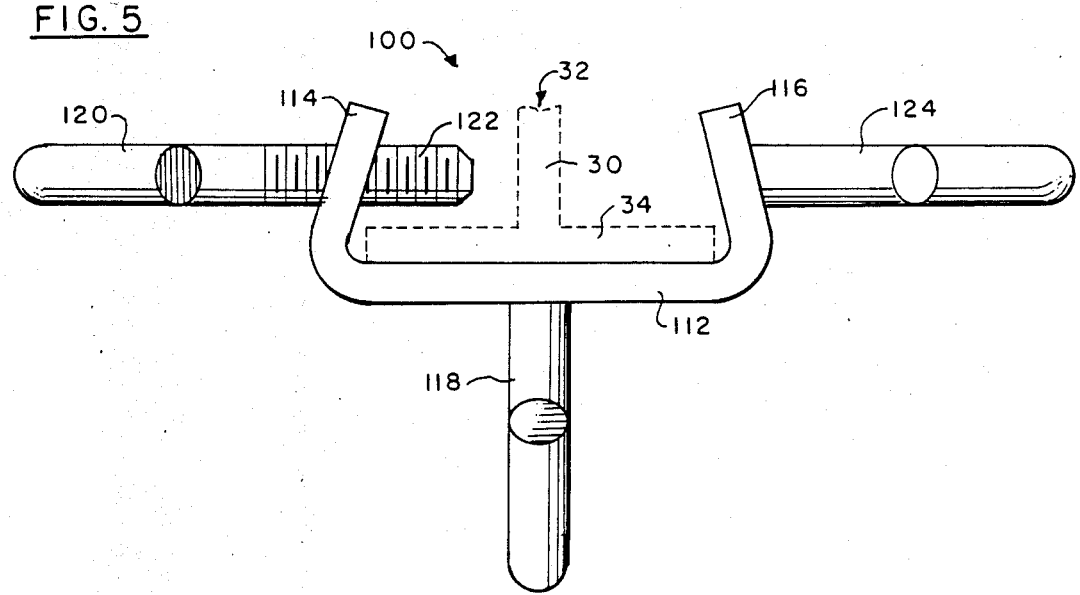

ADJUSTABLE LOAD BINDING HOOK

BACKGROUND OF THE PRIOR ART

This invention relates generally fastening devices and in particular to devices for binding loads on trucks and other vehicles.

It is currently the practice in the trucking industry to attach load binding ropes, chains and other bindings, to hooks that are welded to the peripheral metal frame surrounding the truck bed or to other metallic structural parts of the truck or trailer that are convenient and accessible.

The common locations for these load binding hooks are generally exposed and subject to frequent damage from unintentional bumps, impacts, overloads and the like, causing the welds to fail and the hooks to be lost or made unusable.

These hook failures almost always occur while the vehicle is on the road where spare hooks and welding equipment are not available.

Because most truck and trailer beds are constructed from a base support frame of I-beams, and because these I-beams extend laterally under the truck or trailer bed, they represent a good location for attachment of a load binding hook.

The prior art methods of attaching devices, such as hooks or the like, to an I-beam include two-part devices having U-shaped legs that wrap around the I-beam flange with a clamping device to hold the two parts together.

Other prior art methods include a plier-like gripping member whose jaws engage the two edges of the I-beam flange in combination with a cam device for maintaining the gripping pressure against the flange edges.

All the prior art devices are more complicated and costlier to produce than the device of the present invention.

In addition, there is no indication that these prior art devices were eve used or were conveniently adaptable for use on a truck or trailer.

SUMMARY OF THE INVENTION

The adjustable load binding hook of the present invention is a simple one piece device fabricated out of a generally rectangular strap or bar of sheet metal defining a generally flat base support member. The opposite sides of the base support member are deformed to define first and second base support flanges sloping toward each other and projecting from the same side of the base support member. A means for attaching the base support member to the flange of an I-beam is included in one of the base support flanges. One or more hooks are attached to the base support member and the two base support flanges. The base support flanges can make equal or different acute angles with the base support member.

It is, therefore, an object of the present invention to provide an adjustable load binding hook for binding or holding a load.

It is a further object of the present invention to provide a load binding hook that can be connected to the web of an I-beam.

It is another object of the present invention to provide a load binding hook that is easily connected to the web of an I-beam.

It is yet a further object of the present invention to provide a load binding hook for a truck, trailer of the like that is adjustable along the length of an I-beam.

It is still another object of the present invention to provide an adjustable load binding bracket having multiple hooks attached thereto.

These and other object of the present invention will become manifest upon review of the following detailed description when taken together with the drawings.

BRIEF DESCRIPTION OF THE DRAWINGS

FIG. 3 is a side elevational view of the adjustable load binding hook of FIG. 1.

FIG. 4 is a top view of the adjustable load binding hook of FIG. 1.

FIG. 5 is an end elevational view of a 3-hook adjustable load binding hook of the present invention.

DESCRIPTION OF THE PREFERRED EMBODIMENT

Figure 1:
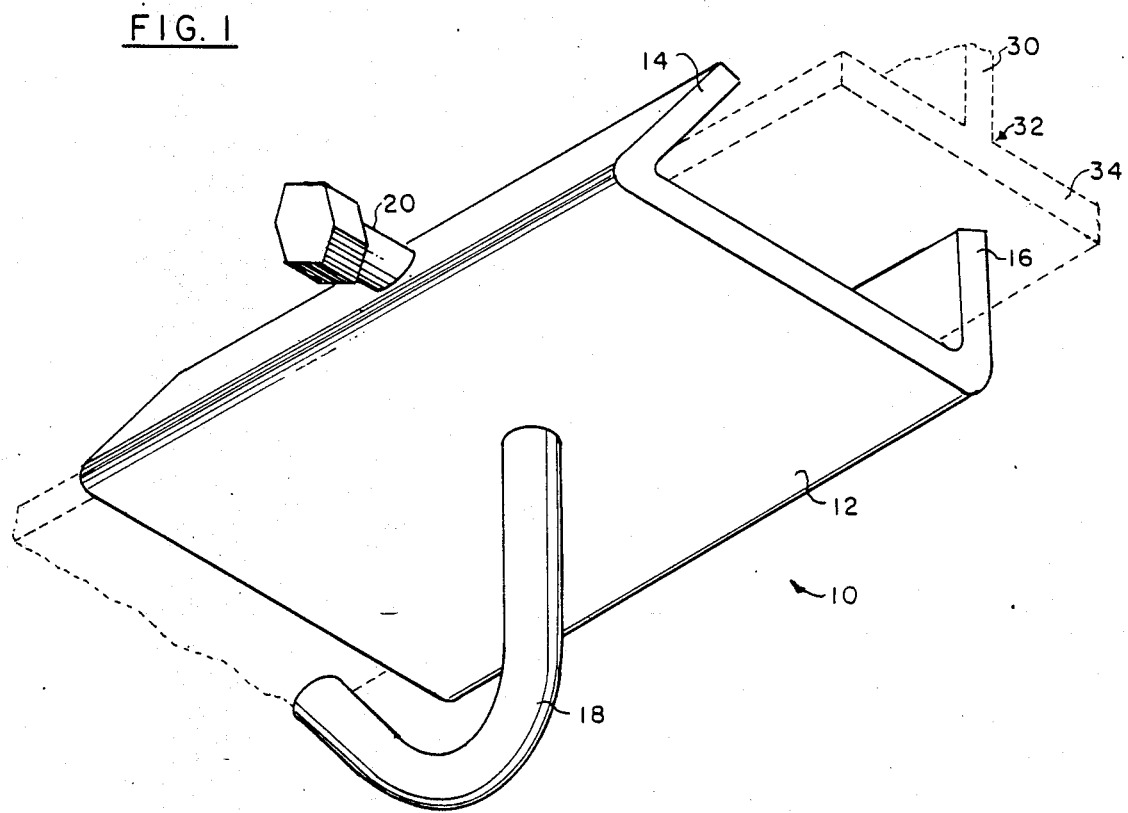
FIG. 1 is an isometric of the adjustable load binding hook of the present invention shown connected to the underside of an I-beam flange.

With reference to FIG. 1 there is illustrated a typical adjustable load binding hook 10 of the present invention fabricated from a generally rectangular, flat piece of sheet metal or a rectangular metal bar comprising a base support member 12 having opposite sides deformed to define an first base support flange 14 and a second base sport flange 16 projecting from the upper side of base support member 12 and sloping toward each other at an acute angle to base support member 12.

As an alternative, first and second base support flanges 14 and 16 can be attached, as by welding or the like, to the opposite edges of base support member 12.

A hook 18 is attached, as by a hole and threaded leg or by welding or the like, to base support member 12 proximate the center thereof. The plane of hook 18 is adapted to be generally parallel to the sides of base support member 12 from which are deformed or attached to first and second base support flanges 14 and 16, respectively.

A bolt 20, threadably engaging and passing through first flange 14, is used to bear against and frictionally engage web 30 of I-beam 32 to connect base support member 12 to flange 34 of I-beam 32.

In FIG. 1, adjustable load binding hook 10 is shown as it would be connected to a typical I-beam 32 on the underside of a typical truck or trailer bed.

Adjustable load binding hook 10 of FIG. 1 is typically connected to I-beam 32 near the periphery or side of the truck or trailer bed (not shown) which would be proximate the end of the I-beam seen projecting out of the drawing. The rope, chain or the like (not shown) binding the load to the bed of the truck or trailer would then pass over the edge of the bed and down under the bed to engage or be tied to hook 18.

Figure 2:
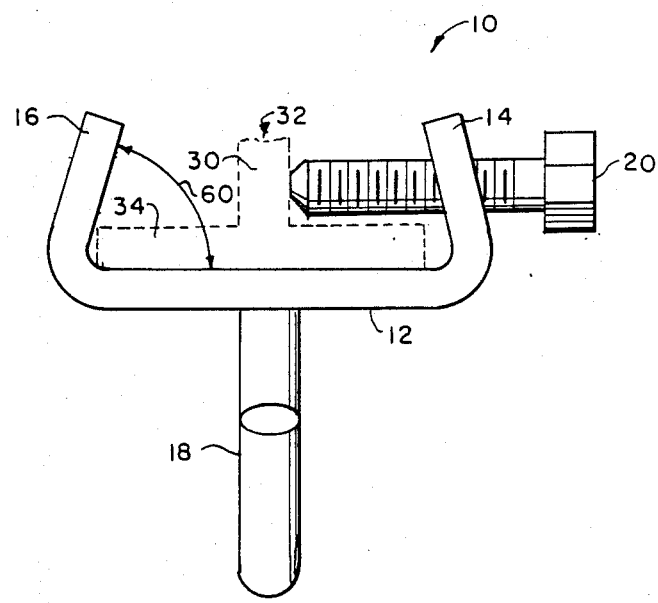
FIG. 2 is an end elevational view of the adjustable load binding hook of FIG. 1.

With reference to FIG. 2, there is illustrated an end elevational view of the adjustable load binding hook 10 of FIG. 1 showing how base support member 12 is connected to I-beam 32.

In FIG. 2, threaded bolt 20 is adapted to engage threaded hole 38 in base support flange 14 and pass therethrough to bear against and frictionally engage web 30 of I-beam 32. Bolt 20 thus forces the edge of I-beam flange 34 against base support flange 16 to cause them to become frictionally engaged proximate the intersection of base support flange 16 with base support member 12.

Since base support flange 16 slopes inwardly toward base support flange 14 and forms an acute angle with respect to base support member 12, it will resist any movement from the moment forces applied to it by the binding means connected to hook 18.

With reference to FIGS. 3 and 4, it will be noted that an additional threaded hole 40 has been provided in second base support flange 16. The purpose of this hole is to provide of a further hook (not shown) having a threaded leg adapted to engage hole 40 and provide and additional means for binding the load to the truck or trailer bed.

Figure 6:
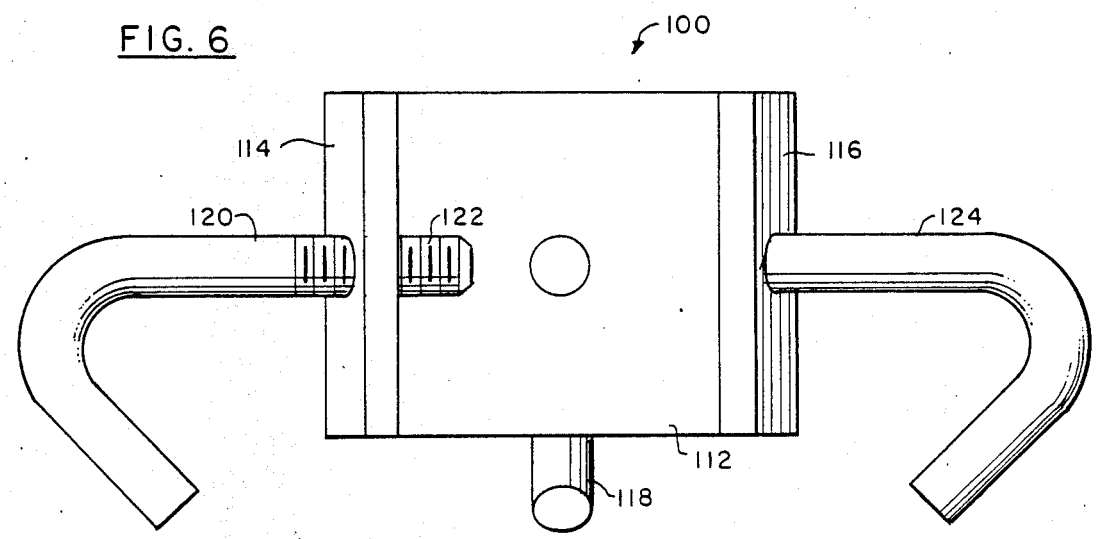
FIG. 6 is a top view of the 3-hook adjustable load binding hook of FIG. 5.
Figure 7:
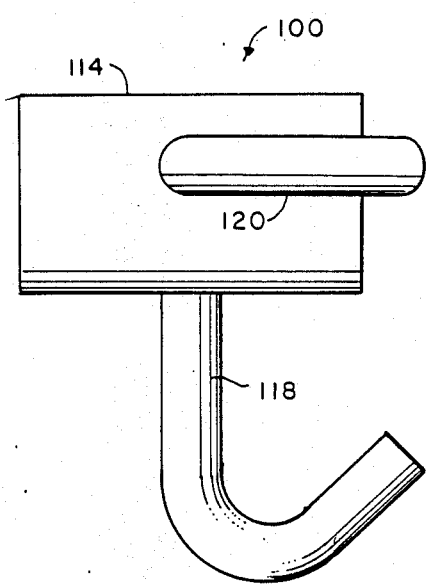
FIG. 7 is a side elevational view of the 3-hook adjustable load binding hook of FIG. 5.

This further embodiment can be seen in FIGS. 5 through 7.

With reference to FIG. 5, there is illustrated a 3-hook adjustable load binding hook 100 of the present invention comprising a generally rectangular, flat piece of sheet metal or rectangular bar of metal comprising a base support member 112 having opposite sides deformed to define a first base support flange 114 and a second base support flange 116. Both base support flanges 114 and 116, respectively, project from the upper side of base support member 112 and slope, at an acute angle to base support member 112, toward each other.

As an alternative, first and second base support flanges 114 and 116 can be attached, as by welding or the like, to the opposite edges of base support member 112.

A first hook 118 is attached, as by a hole and threaded leg or by welding or the like, to base support member 112 proximate the center thereof. The plane of hook 118 is adapted to be generally parallel to the sides of base support member 112 from which have been deformed to top define, or have attached thereto, first and second base support flanges 114 and 116, respectively.

A second hook 120, having a threaded leg 122, is adapted to engage and passing through first flange 114 and is used to frictionally engage an bear against web 30 of I-beam 32 to connect base support member 112 to flange 34 of I-beam 32.

A third hook 124 is attached to second base support flange 116 as by hole or threaded leg or the like.

The plane of second and third hooks 120 and 124, respectively, are adapted to be parallel to the plane of base support member 112 and have their openings facing the in same direction as the opening for hook 118.

Thus, two additional hooks are provided as an additional convenience in tying a load to the bed of the truck or trailer.

Figure 8:
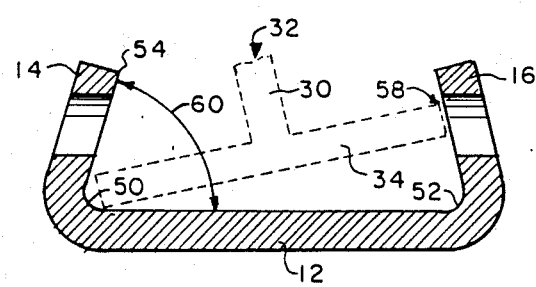
FIG. 8 is an end elevational view of the adjustable load binding hook base support illustrating the method of placing the base support on the flange of an I-beam.

With reference to FIG. 8, there is illustrated an end elevational view of base support member 12 with first and second flanges 14 and 16 showing the method by which base support member 12 is inserted on flange I-beam 32.

In order for base support member 12 to be retained on I-beam flange 34 in a relatively fail-safe configuration, the distance between first base support flange 14 and second base support flange 16 where they meet base support member 12 (proximate points 50 and 52, respectively) must be greater than the width of I-beam flange 34.

At the same time, the distance between the top inside corner 54 of base support flange 14 and the top inside corner 56 of base support flange 16 must be less than the width of I-beam flange 34.

Furthermore, the distance between one of the points of intersection 50 or 52 of a base support flange 14 or 16, respectively, with base support member 12 and the a point 58 at which I-beam flange 34 is perpendicular to either base support flange 14 or 16 when one edge of I-beam flange 34 is engaged proximate either point of intersection 52 or 50, respectively, must be slightly less than the width of I-beam flange 34, as shown in FIG. 8. This will allow base support member 12 to be installed on I-beam flange 34 by placing, for example, one edge of I-beam flange 34 proximate point of intersection 50 and, using that as a pivot, rotating base support 12 to bring the other edge of I-beam flange 34 to rest proximate point of intersection 52.

Applicant has found that the most satisfactory installation of base support 12 occurs when acute angle 60, the angle first or second base support flanges 14 and 16, respectively, make with respect to base support member 12 is between 60 and 85 degrees.

Figure 9:
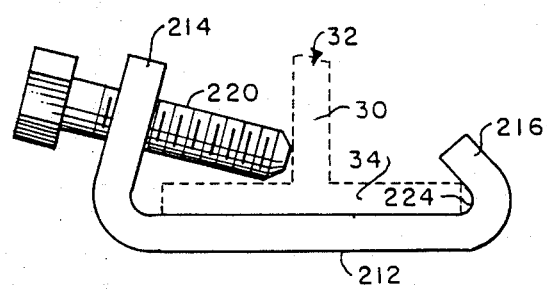
FIG. 9 is an end elevational view of a further embodiment of the load binding hook base support of the present invention illustrating a different configuration of the base support flanges which are used to connect the base support member to the flange of an I-beam.

With reference to FIG. 9, there is illustrated a further embodiment of the base support portion of the adjustable load binding hook of the present invention in which the two side flanges are placed at different angles to the base support.

In FIG. 9, base support member 212 utilizes a first base support flange 214 making an angle of 85 degrees with respect to base support member 212. The second base support flange 216 makes an angle of 60 degrees with respect to base support member 212. In addition, retaining member or bolt 220 is adapted to threadably engage first base support flange 214 perpendicular thereto such that it bears against web 30 of I-beam 32 proximate the point of connection of web 30 with I-beam flange 34. At the same time, it forces the edge of I-beam flange 34 against both second base support flange 216 and base support member 212 proximate the corner 224 defined by the intersection of second base support flange 216 with base support member 212.

Figure 10:
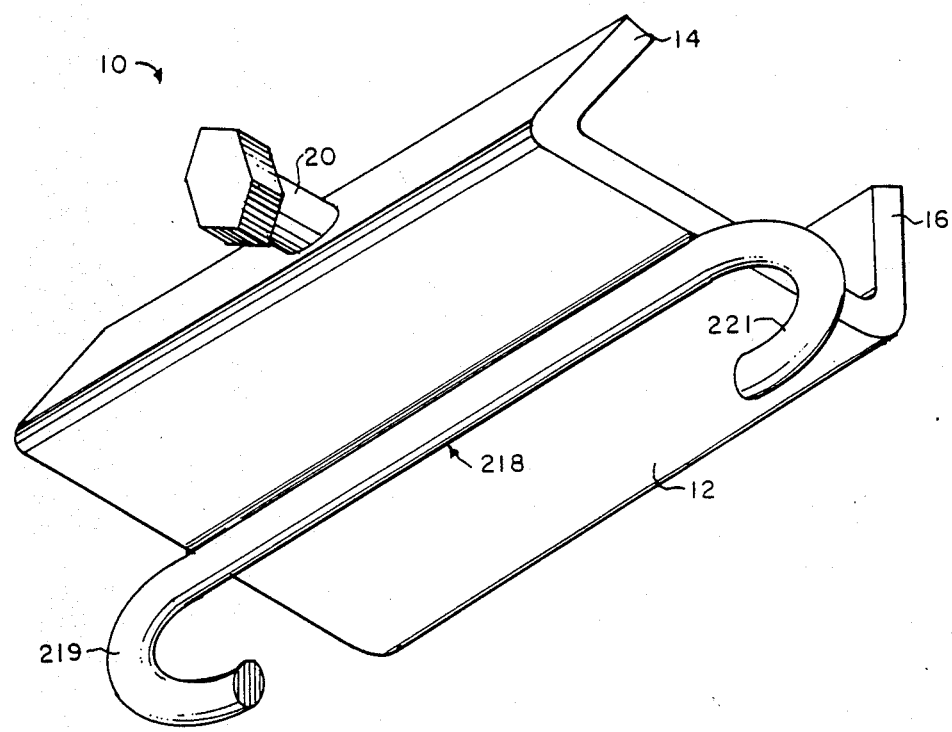
FIG. 10 is an isometric view of the underside of the adjustable load binding hook of the present invention showing the use of a double-ended load binding hook attached thereto.

With reference to FIG. 10, there is illustrated an isometric view of the underside of the adjustable load binding hook 10 of the present invention showing the use of a double-ended load binding hook 218 attached thereto.

Double-ended load binding hook 218 comprises hooks 219 and 221 disposed at opposite ends of hook 218 and is attached to base support member 12 as by welding or the like. The longitudinal axis of hook 218 can be arranged parallel to the the longitudinal axis of the I-beam to which load binding hook 10 is connected, as shown, or hook 218 can be attached at right angles to the beam axis should the truck or trailer bed construction so dictate.

The use of hook 218 serves several purposes. By being attached as shown, it allows the binding of larger loads. In addition, since it is reversible, damage to one hook would not cause the entire assembly to become useless.

To use the adjustable load binding hook of the present invention, base support member 12 (or 112 or 212) is placed on flange 34 of I-beam 32 as shown in FIGS. 2 (or 5, 8 or 9) and bolt or fastening device 20 is tightened to force I-beam flange 34 against the opposite base support flange. Hook 18 (or 118 or 218 is now ready to receive a load binding rope, chain or the like.

Although the invention has been described in detail, other configurations are possible. The above description is not intended to limit the scope of the invention which is only so limited by the following claims.

What is claimed is:

1. An adjustable load binding hook comprising
a support beam having a flange and a web, said support beam web attached substantially perpendicular to said support beam flange longitudinally along the length thereof and substantially at the midpoint of the width thereof,
a generally rectangular base support member,
a first base support flange integral with and projecting from said base support member along one side thereof and sloping downwardly toward said base support member to define a fixed, predetermined acute angle ranging from 60 to 85 degrees with respect to said generally rectangular base support member,
a second base support flange integral with and projecting from said support member and sloping inwardly toward said base support member and toward said first base support flange along the side of said base support member opposite said first base support flange to define a fixed, predetermined acute angle ranging from 60 to 85 degrees with respect to said generally rectangular base support member,
the distance between said first base support flange and said second base support flange, as defined by the point of intersection of the inside of said first base support flange and said base support member and the point along the inside surface of said second base support flange nearest said intersection, is slightly greater than the width of said support beam flange, and
the distance between the edges of said first and second base support flanges distal said base support member is slightly less than the width of said support beam flange,
a hook attached to said base support member and projecting therefrom in a direction opposite said first and second base support flanges, the plane of said hook disposed parallel to the line of intersection said first and second base support flanges makes with said base support member, and
means for connecting said base support member to said support beam comprising
means connected to said first base support flange and bearing against the web of said support beam for forcing the edge of said support beam flange against the inside corner of the intersection of said second base support flange and said generally flat rectangular base support.

2. An adjustable load binding hook comprising
a support beam having a flange and a web, said support beam web attached substantially perpendicular to said support beam flange longitudinally along the length thereof and substantially at the midpoint of the width thereof,
a generally rectangular base support member,
a first base support flange integral with and projecting from said base support member along one side thereof and sloping inwardly toward said base support member to define a fixed, predetermined acute angle ranging from 60 to 85 degrees with respect to said generally rectangular base support member,
a second base support flange integral with and projecting from said support member and sloping inwardly toward said base support member and toward said first base support flange along the side of said base support member opposite said first base support flange to define a fixed, predetermined acute angle ranging from 60 to 85 degrees with respect to said generally rectangular base support member,
the distance between said first base support flange and said second base support flange as defined by the point of intersection of the inside of said first base support flange and said base support member and the point along the inside surface of said second base support flange nearest said intersection is slightly greater than the width of said support beam flange, and
the distance between the edges of said first and second base support flanges distal said base support member is slightly less than the width of said support beam flange,
a first hook comprising
a generally straight leg portion having each end bent to define a hook, said leg portion and said hooks defining a common, generally flat plane,
the leg portion of said first hook attached to said base support member and the plane of said hook disposed perpendicular to the base of said base support member and generally parallel to the line of intersection of said base support member and said first and second base support flanges, and
means for connecting said base support member to said support beam comprising
means connected to said first base support flange and bearing against the web of said support beam for forcing the edge of said support beam flange against the inside corner of the intersection of said second base support flange and said generally flat rectangular base support.

3. The new adjustable load binding hook as claimed in claim 2 wherein said means connected to first base support flange and bearing against the web of said support beam for forcing the edge of said support beam flange against the inside corner of the intersection of said second base support flange and said generally flat rectangular base support, comprises
means defining a threaded hole in one of said base support flanges,
a second hook having a hook end and a leg end, said leg end having threads thereon adapted to engage said threads in said threaded hole in one of said base support flanges with the end of said leg adapted to engage the web of said support beam,
means for preventing rotation of said second hook comprising
means for tying down a load adapted to engage said hook end of said second hook.

* * * * *